May 26, 1953     G. J. GIEL, JR., ET AL     2,640,164
MAGNETIC RING COUNTER
Filed Nov. 14, 1950     3 Sheets-Sheet 1
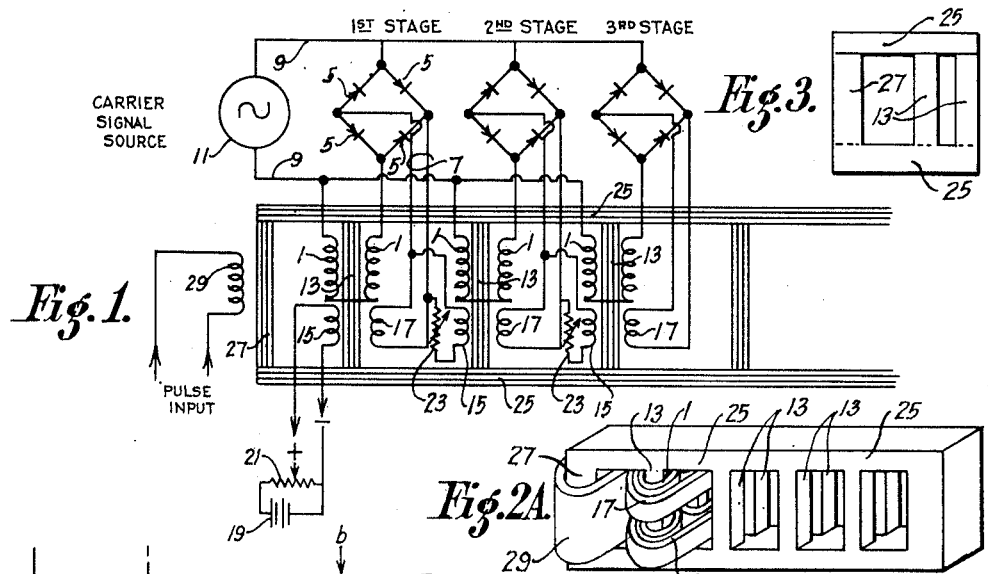
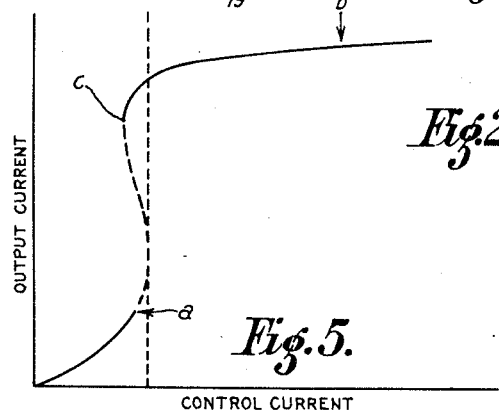
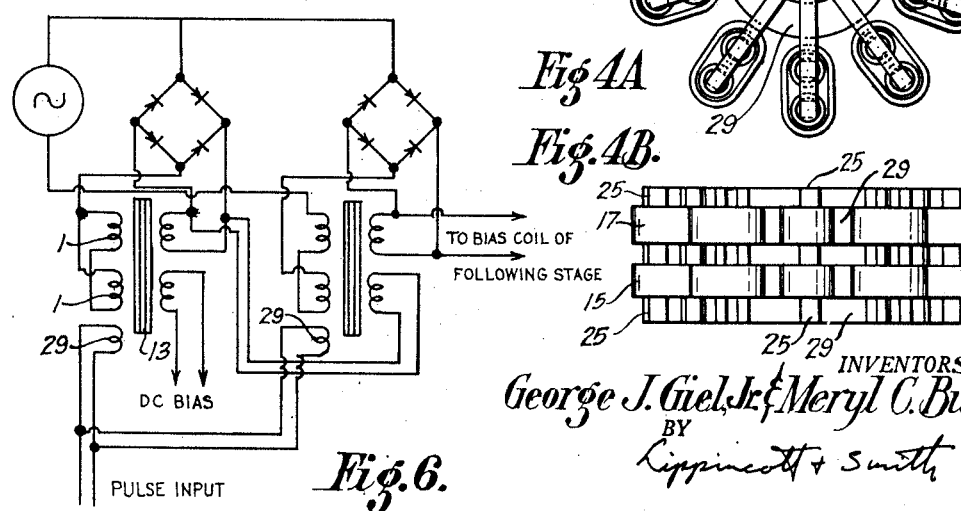
INVENTORS
George J. Giel, Jr. & Meryl C. Burns
BY
Lippincott & Smith
ATTORNEYS INVENTORS
George J. Giel, Jr. & Meryl C. Burns
BY
Lippincott + Smith
ATTORNEYS Patented May 26, 1953

2,640,164

UNITED STATES PATENT OFFICE 2,640,164

MAGNETIC RING COUNTER

George J. Giel, Jr., and Meryl C. Burns, Richmond, Calif., assignors to Berkeley Scientific Corporation, Richmond, Calif., a corporation of California Application November 14, 1950, Serial No. 195,636

13 Claims. (Cl. 307—88)

This invention relates to counting or scaling devices for registering pulses.

Counters for this general purpose employing vacuum tube circuits are now well known and are employed in various ways such as for measuring pulses from a Geiger-Müller counter to determine the activity of radio-active materials, storing or adding digits in electronic computers, programming operations of various kinds by gating various circuits, performing commutating operations of various types and other operations too numerous for any complete catalog. Electronic computers, however, employ a large number of tubes and while such tubes have been made to have, on the average, an extremely long life, where hundreds or thousands of them are employed the statistical probability of failure of one tube within any given period becomes quite high. In many of the devices of the kind mentioned the failure of a single tube may effectively disable the entire equipment. In such cases, even though the probability of failure of any individual tube may be extremely small, the probability of failure of one out of thousands and hence of the apparatus as a whole becomes large and, in general, increases as time goes on.

Accordingly, it has been proposed to use the properties of the magnetic amplifier for counting purposes. Since these latter devices employ no such fragile elements as filaments or vacuum-tight envelopes the reliability of apparatus using a large number of them is much higher than is the case where the vacuum tube technique is employed. In the past, however, counting circuits of the magnetic type have been less versatile than the known electronic equipment and the latter has therefore not been superseded by counters of the magnetic type to the extent that might have been anticipated.

For most purposes it is desirable that counters operate on a numerical system having the base ten. Where large numbers are to be handled on this basis they are usually arranged in decades, each decade counting around and returning to its initial state after receiving ten input impulses and passing on, to a second decade, a pulse generated as the preceding stage counts around to its original state.

Electronic ring counters are known and have been used in various important types of electronic equipment. Substantially all of such electronic counters use some modification of the well-known Eccles-Jordan "flip-flop" circuit. A decade ring constructed in this fashion employs twenty single-purpose or ten dual-purpose tubes. By going to a binary system, wherein each successive pair of tubes is connected in cascade with the last, the number of tubes can be greatly reduced but the numbers registered are difficult to read without a great deal of practice.

Using the binary system eight single-purpose or four double-purpose tubes will count 16. In order to make reading easier, however, it is quite customary to convert a four-stage binary counter into a decade counter by causing it to feed back additional pulses into earlier stages of the chain at various intervals so that only ten input pulses are necessary to cause it to count around to its original state. This makes reading easier but complicates the circuitry and in many cases it would be desirable to use the ring type of counter instead. This is not only the case where a decade reading is required but is particularly true where a ring is needed which will count around in an odd number of pulses.

While magnetic counter or scaling circuits operating on the flip-flop principle have been described and have been connected in cascade in much the same manner as binary electronic counters, this invention relates specifically to the employment of the magnetic principle to counters of the ring type, among its objects being:

(1) To provide a type of counter circuit adaptable to rings for registering any desired numbers of digits;

(2) To provide a type of counter having a high degree of flexibility, being usable, by minor modification, to substantially all purposes for which electronic counters have been used;

(3) To provide a counter in which the entire ring may be embodied in a single small, compact unit;

(4) To provide a counter which will either trip successive stages in the ring, leaving them in the tripped state as successive pulses come in and resetting all stages after the count-around is complete or, in the alternative, trip successive stages and simultaneously reset the preceding stage;

(5) To provide a counter wherein the tripping of any stage can be employed to operate a gating circuit, the gates operating successively or cumulatively as desired; and (6) To provide a counter which will subtract, without the use of complementary numbers.

Other objects and advantages of the invention will become apparent to those skilled in the art or will be specifically described in the detailed description which follows.

Considered broadly the invention comprises a plurality of reactive windings within each of which is a ferro-magnetic core carrying, in addition, at least two biasing windings. Means are also provided for including in the core a flux generated by the electrical impulse to be counted. Each of the reactive windings is connected in series with the input circuit of a rectifier and all of these series circuits are connected in parallel across a common pair of supply leads from an alternating current source. The output of each of the rectifiers is connected to supply two biasing windings, one of them being on the same core as the reactive winding through which the rectifier in question is supplied while the other biasing winding is upon a succeeding core of the ring up to the last of the series, which may or may not connect to the biasing coil of the first core depending upon the type of count desired. Means are provided for magnetically biasing the first core of the succession to less than saturation and a circuit is also provided for producing a unidirectional pulse of flux in all of the cores simultaneously and in the same direction as the biasing flux, this serving to carry the core far enough toward saturation to reduce the impedance of the reactive coil, and by increase of current through the rectifier both complete saturation and bias the next core. For most purposes means are also provided whereby the tripping of the final stage so reduces the flux in the first as to reverse the original tripping action and reset the counter. If desired any or all of the cores may carry an additional biasing coil supplied by the rectifier associated with a succeeding coil so that a tripping of the latter stage by an input pulse either resets the preceding stage or locks it in a tripped condition.

Preferably all of the cores are combined into a single composite core structure, each individual core forming a leg magnetically in parallel with the others, the input pulses being supplied through an additional leg magnetically coupled to all of the output legs. Preferably, too, the leg carrying the input pulses is located axially, with the other or output legs mounted symmetrically about it.

All of this will be more apparent from the detailed description which follows, taken in connection with the accompanying drawings wherein:

Fig. 1 is a schematic diagram indicating the fundamental organization of the apparatus, the diagram showing only the connections of the first three stages of a ring which may be as large as may be desired;

Figs. 2A and 2B are isometric views of one type of magnetic circuit adaptable to a ring counter of a limited number of stages;

Fig. 3 is an elevation of the core of one counter stage as used in a preferred form of the invention.

Fig. 4A is a plan, and Fig. 4B an elevation of a preferred form of decade ring counter.

Fig. 5 is a graph showing the relation between control current and output current in any of the counter stages;

Fig. 6 is a schematic diagram showing two stages of a ring wherein the cores of the successive stages are magnetically separate;

Figure 7:
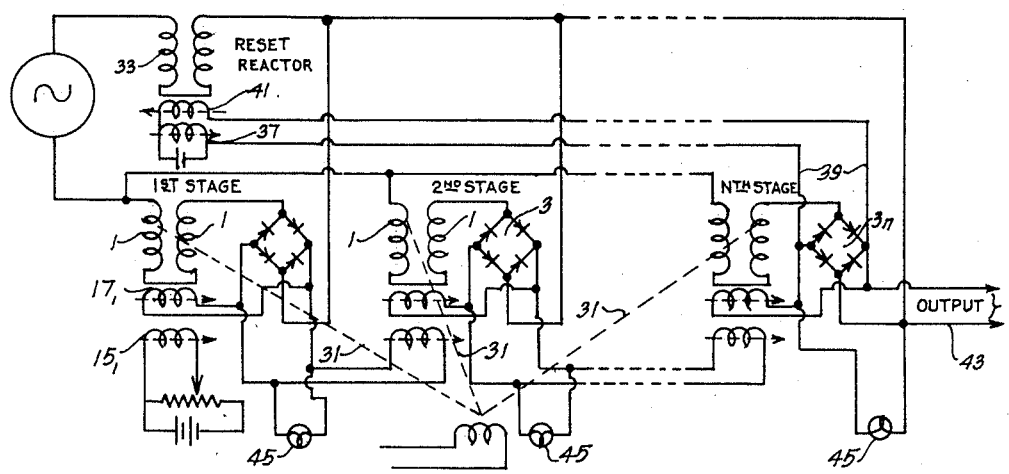
Fig. 7 is a schematic diagram of the first, second and nth stages of an $n$ stage counter showing one means of resetting when the ring count has been completed; in this and the succeeding figures the magnetic circuit is omitted in order to show the electrical circuits more clearly.

In the detailed description which follows it will be understood that each successive stage in a ring counter is very nearly identical to the preceding and succeeding stages. There may be some deviation from the general pattern in connection with the first or last stages or both, but in general the description of one stage will suffice for all. Accordingly in the drawings the stages are designated as first, second, et cetera, up to the nth, where $n$ may be any integer within reason but is usually 10 or less. The corresponding components of each stage will therefore be identified by the same reference characters, the subscripts 1, 2, or $n$, being used to designate a component of a specific stage where such designation is necessary, with the subscripts being omitted in the drawings except where specific identification is required.

Each rectifier stage comprises a reactive coil or coils 1 connected in series with rectifying means, generally designated as 3. The rectifying means shown comprises rectifying units 5 arranged in the well-known bridge circuit, the input or A. C. supply being connected to one diagonal of the bridge and the output circuit 7 to the other diagonal. Usually the units 5 will be of either the dry-disc or the "crystal diode" type. However, other types of rectifying elements and circuits may be used, even including half wave circuits if the rectifiers are condenser-bridged, the counting rate need not be high and the tripping pulses can be long enough. The series circuit comprising coil 1 and rectifier 3 is connected across a common supply circuit, in parallel with the corresponding circuits of all of the other stages of the ring. The supply circuit 9 is fed by an alternating carrier source 11 which may be of almost any frequency depending upon the resolving power of the counter, i. e., the rate at which it is desired to have it discriminate between successive pulses. The frequency should be at least double the maximum rate to be resolved; i. e., the carrier frequency should go through at least two and preferably three or more complete cycles for each pulse to be counted.

The reactive winding 1 is wound on a core 13 which also carries a pair of biasing windings 15 and 17. The device is operable if the windings are so arranged as to couple the reactive and biasing windings electromagnetically. This, however, results in induction of carrier frequency potentials in the biasing coils, which is usually troublesome. It is therefore preferable to arrange the windings so as to avoid such coupling. This may be done by splitting the leg of the core which carries the windings into two sections and arranging the windings thereon so that the flux induced by the reactive winding is oppositely directed in the two sections of the leg while that induced by the biasing winding is in the same direction. As viewed from the biasing windings the rate of change of total flux due to the alternating carrier is then zero, since increase of flux in one section is balanced by an equal decrease of flux in the other section.

The first stage biasing winding 15, may be fed from an external D. C. source, shown as a battery 19 bridged by a potentiometer 21 for adjusting the bias. This is merely illustrative; other sources of bias may be used, some of which will be described hereinafter.

The biasing winding 17 is supplied from the rectifier 3, through circuit 7 connected in such polarity that the rectified current induces a flux in the same direction as that induced by the current in winding 15. Also connected to circuit 7 is the biasing coil 15 of the succeeding stage. It is theoretically immaterial whether the windings are connected to circuit 7 in series or parallel; in Fig. 1 the parallel connection is shown, this having the practical advantage that the current through winding 15 of the succeeding stage may be individually adjusted by a low ohmage variable resistor 23 in series therewith. This refinement is often unnecessary.

In the preferred form of the device all the cores 13 are connected magnetically in parallel, as legs of a single composite core, through the yokes 25, coupling all of the legs magnetically to an input leg 27. This input leg carries an input coil 29 which carries the pulses to be counted, from whatever source derived.

The composite core may be of the ladder type as shown in Fig. 2, which shows the pulse input coil 29 on leg 27, and the windings 1, 15 and 17 on leg 13. The windings on the other legs 13 are not shown, in order better to illustrate the subdivision of these legs into sections 30 on which the two halves of the reactive windings are disposed. This is satisfactory for a small number of stages, but the reluctance of the paths increases from stage to stage, as does the magnetic leakage. Furthermore, as successive legs saturate the return flux tends increasingly to desaturate the others, and as stages are added a point is eventually reached where saturation cannot be maintained, even though an additional unwound leg 32 be provided to carry a portion of the return flux.

A preferred structure is therefore that shown in Figs. 3, 4A and 4B. Fig. 3 shows the core of one stage, including the stage-leg 13 comprising two sections 30, the yokes 25 and the leg 27 which forms a portion of the leg common to all stages.

A number of these cores are arranged with their yoke portions radiating from a common center as best shown in Fig. 4A, the legs 27 being nearest the axis to form, collectively, the common leg on which the pulse coil 29 is wound. With this construction the magnetic paths of all legs are equal and current in the central coil will create an equal magnetomotive force in all stages. Furthermore there is almost no tendency for saturation flux from one stage to return through the saturated leg of another and desaturate it. The substantial identity of the magnetic circuits of the several stages makes adjustment easier and uniform so that the resistors 23 may safely be omitted.

The performance of any stage depends upon the decrease of inductance of the reactive coils on the output legs of the device with increasing saturation of the core. The inductance L of the coil is defined as $d\phi/di$ where $\phi$ is the flux linkage within the coil and $i$ is the instantaneous current. $\phi$ is equal to the ampere-turns per unit length of path, times the permeability mu. The factor mu decreases rapidly as saturation is approached. The device operates owing to change of inductance, and consequently of impedance, due to this cause. The reactive coils 1 are proportioned with relation to the supply voltage so as to operate on a flux density which will not, of itself, cause saturation. When these coils alone are excited they offer a high impedance to the alternating supply frequency from the carrier current source 11. When a bias is applied through the coil 15 from the D. C. source 19, however, $d\phi/di$ decreases as the biasing current is increased and the apparent impedance of the coil 1 falls. Current through the reactive coils and the rectifier network 3 therefore increases, and due to the arrangement of the rectifier network can flow only through the output circuit 7 and thence, at least in part, through the bias coil (which also may be termed the feedback coil) 17. This further increases the bias and decreases the inductance causing further current flow and a cumulative effect.

This is indicated by the graph of Fig. 5, wherein control current or, what is proportional to the same thing, flux through the core 13 is plotted along the axis of abscissas while the output current is plotted along the ordinate axis. When the control current through either coil 15, coil 17, or both exceeds the value whereat the slope of the curve reverses in direction the circuit immediately becomes unstable and the output current jumps from the lower to the upper branch of the curve. In operation the bias current in the coil 15₁ is set so that the output current is just below the unstable point, about at the position $a$ on the curve. The pulses to be counted are applied to the coil 29 in such sense and magnitude as to carry a flux to or beyond the unstable point so that the output current immediately jumps to the upper branch of the curve. The increased rectified current which flows when the impedance of coil 1 drops not only holds the current on the upper branch but advances it along this branch to some point such as $b$.

With the connections shown in Fig. 1, where the bias coil 15 of each succeeding stage is connected in parallel with the coil 17 of the preceding stage, the current divides between these two coils and the output current of the coils 1 provides the necessary bias to sensitize the stage following. The next pulse therefore trips the stage thus sensitized and the operation repeats in as many stages as may be desired.

As far as has been thus far described each coil, once tripped, remains in its low impedance state and its core therefore offers a high reluctance to the magnetic pulses generated by current in the coil 29. For this reason, where this type of operation is used and a counter of only a limited number of stages is required, the ladder type core of Fig. 2 is quite feasible. When none of the stages are tripped a major portion of the pulse flux flows through the core leg which is closest to the pulsing coil 29, both leakage and added reluctance serving to limit the flux passing through the other parallel legs. The greatly increased reluctance of the first leg after the coil has been tripped, however, diverts a greater part of the flux formerly passing through this leg into the next succeeding leg and hence the pulse flux in the latter is nearly equal to that which originally served to trip the coil on the first leg. Within limits this same effect takes place as legs more and more remote from the coil 29 are tripped.

The arrangement shown in Fig. 6 operates electrically in substantially the same manner as does that of Fig. 1. From a practical standpoint it is, however, much less desirable from the points of view of efficiency, weight, and space occupied. In this arrangement there is no coupling of magnetic circuits, each of the reactive coils 1' being wound on a separate ferro-magnetic core 13'. All other elements are substantially the same and exercise the same functions as those shown in Fig. 1 and are therefore identified by the same reference characters distinguished by accents. The one exception to this is the pulse input; in the absence of magnetic coupling between the stages the input pulse is supplied to all stages through separate input coils 29' which may be connected either in series or in parallel as shown. The requirement of separate cores for each stage and the additional complexity of the input circuit make this arrangement much less desirable than the arrangement using the magnetic linkage and a common input or pulse coil.

Figure 8:
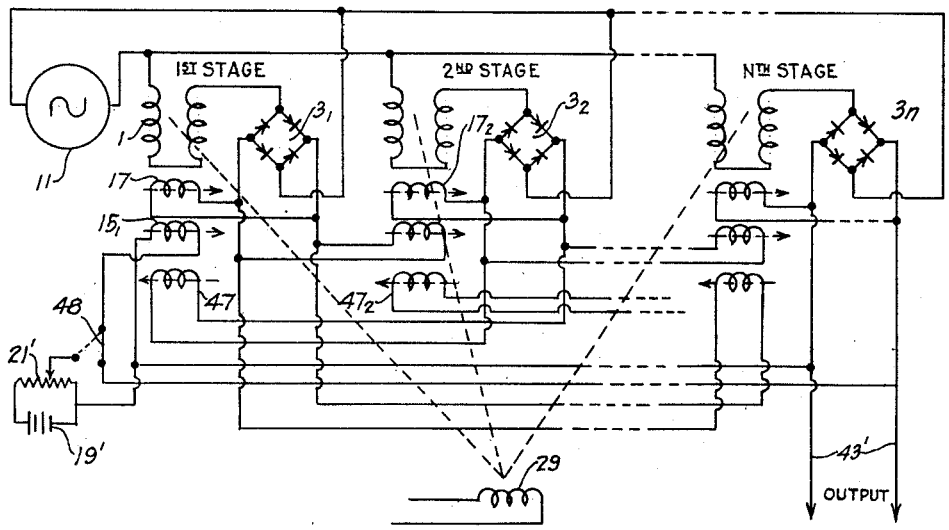
Fig. 8 is a circuit diagram of an embodiment of the device wherein the tripping of each stage resets the stage immediately preceding it and the operation of the final stage serves to set the initial stage, only one stage being tripped at any one instant.

As has already been stated, in the device as so far described any stage which has once been tripped remains in that state. For certain applications this may be desirable; the device may be reset to zero by a momentary interruption of the carrier source and there are certain applications where it is desirable that a counter register digits up to its full capacity and then cease operation until manually restored to its initial state. For a majority of applications, however, a true ring counter is desired which will clear itself and start anew when its full capacity is reached. Figs. 7 and 8 indicate two means of accomplishing this, each being adapted to a specific type of requirement. In these two figures, as well as Figs. 9 and 10, the magnetic core structure is omitted from the drawings and only the electrical circuits are shown. The actual fact of the mutual magnetic coupling is indicated symbolically by the dotted lines 31 originating in each case at the pulse coil 29 and directed to the various stages shown. The direct flux in the biasing coils is indicated by the dotted arrows drawn through these coils; coils threaded by arrows pointing in like directions are so connected that the fluxes induced within them boost, whereas oppositely directed arrows indicate bucking fluxes. Since the circuit components are distinguished by the same reference characters as those components of Fig. 1 exercising like functions it will be seen, for example, that the flux in the feedback coil 17₁ of the first stage boosts that induced by the biasing coil 15₁, as has already been described.

In the showing of Fig. 7 the operation is exactly as has already been described in connection with the first figure until the nth stage is reached, each stage, up to this point, remaining tripped after it has once been actuated. In order to reset the counter when the last stage is tripped the carrier circuit is effectively interrupted (or is at least greatly reduced in value) to cause resetting in the same general manner as has already been described for manual resetting. One way of accomplishing this is by means of a magnetic amplifier of much the same type as is used in the counter stages, which is inserted in the main supply lead from the carrier source 11 to the reactive coils and rectifiers. This amplifier is indicated by the coils 33, connected in the supply circuit in series with the source 11. The magnetic core of this reactor is biased by means of a coil 35 and source 37 to a degree beyond the unstable point, so that the device operates normally on the upper branch of the curve shown in Fig. 5. Circuit 37 is taken off from the output of the rectifier 3ₙ to feed a counter-flux coil 41 which is poled to buck the flux in the biasing coil 35 thus carrying the control flux back past the point c, whereupon the impedance of the coil 33 rises and the current drops to a point where the output of the rectifiers into the feedback coils 17 is insufficient to maintain the cores of the various stages at saturation. Stated in another fashion, the control current of all stages backs off until the operating point retreats along the curve until it arrives at the point c, when the output currents immediately drop and all stages return to the lower branch of the curve. The effect of this is cumulative. If the various stages are adjusted so that the feedback current alone is not sufficient to hold the various stages in their tripped state, the bias current from the preceding stage also being necessary for this, the reverse tripping of any earlier stage will also unbias the succeeding stages serially, and if the first stage is reverse-tripped all other stages will follow automatically. The reverse tripping of stage n drops the current in the counter-flux coil 41, the core of coil 37 again saturates, and the counter is ready for further pulses.

Simultaneously with the tripping of the final stage it transmits a pulse into the output circuit 43. Due to the immediate retripping following the action of the reset reactor this pulse is of very short duration. It can be used to excite the pulse coil of a succeeding ring or for any other desired purpose.

Fig. 7 also shows one method of connecting indicating lamps 45 to show the number of counts registered by the ring. In this case the lamps will be lighted up to a number corresponding to the number of stages which have been tripped, and will remain lighted until the reset factor functions, the lamps being connected across the output of each stage rectifier. It should be obvious that various other connections may be used to give other types of indication. For example, the lamps could be connected in parallel with the reactive coils 1, in which case their extinguishment would indicate the registration of a count.

It should be noted that a much less elaborate system can be used for resetting the counter to zero, still using the same general principle. For example, if a resistor is substituted for the coils 33 it can, by careful adjustment, be so regulated that as the current through it increases due to the successive tripping of the various stages the voltage across all of the rectifiers will drop progressively. This serves to move the operating point b of all of the stages back along the upper branch of the curve and if the values are properly chosen the tripping of the final stage may be made sufficient so to decrease the currents in all of the stages as to carry the operating point to the point c of the curve, thus automatically securing a resetting action. This requires a somewhat more critical adjustment and results in a device which is more sensitive to changes of supply voltage but it has been made to operate satisfactorily. We prefer, however, the less critical device which is shown in detail Fig. 8 illustrates a different type of reset circuit which can be used where it is desired that only a single stage remain in the tripped state at any one time. In this case no fixed bias, corresponding to battery 19 in potentiometer 21, is used with any of the stages. Instead, the bias for coil 15₁ is supplied from the output of the rectifier 3ₙ, all of the stages being connected in a perfectly symmetrical ring so that any desired stage could be considered as the first. Each stage is provided with an additional coil 47, connected for supply by the output of the succeeding stage. Considering stage 1 to be in the tripped condition, it operates, as before, to bias stage 2 to the point where it will be tripped by the next input pulse. When this occurs the rectifier 3₂ will not only supply biasing current to the next succeeding stage but will also induce a bucking flux in the coil 47, counteracting the effect of the biasing flux supplied by the rectifier 3₁. The result is that this stage immediately reverts to its untripped state. The circuits are so designed, however, that the flux in the feedback coil 17₂ is sufficient to maintain the second stage in its tripped state and, consequently, to bias the succeeding stage. When the latter stage trips and excites the counterflux coil 47₂ this flux need only counteract that in the feedback coil and not an additional biasing flux as well. The action can be made very positive and very stable. The counter will therefore count around indefinitely and the output may be taken from any stage, as indicated at 43', or, if desired, an output can be taken from every stage. As supplied by the device shown, this output will be in the form of a direct current which continues in its steady state until the stage from which it is derived is retripped. Upon occasion this form of output is desirable; if it is wished to pass a short pulse on to a succeeding stage the output can be differentiated by either an inductive or a resistive-capacitive network as is well known.

Since, in this form of the device, no specific provision is made for biasing the first stage, all being substantially identical except as certain of them may or may not be provided with output terminals or with gates as will later be described, when the device is set up and power first applied which, if any, of the stages will trip is indeterminate. This, of course, is usually undesirable and means may be provided for resetting the device so that the stage which will trip upon the initial pulse is determinate. One such means comprises the use of a pre-biasing circuit of the same type as has already been described, comprising a battery or other D. C. source 19" and potentiometer 21" so connected that it may be thrown into the circuit of one of the biasing coils, 15₁ for instance, by means of a switch 48. The biasing potentiometer may be set high enough so that the momentary throwing of this switch is sufficient to trip the stage without the addition of a triggering pulse. Properly adjusted, the stage will remain tripped during the instant when the switch is returned to the normal closed position shown in full lines, and thereafter the operation of the device will proceed as described. After the initial operation this may or may not be necessary; some types of magnetic material have sufficient retentivity so that if the equipment is shut down for a period and power is then reapplied the stage tripped at the preceding operation will trip automatically. The device will thus "remember" a number registered upon it even in the absence of applied power.

Figure 9:
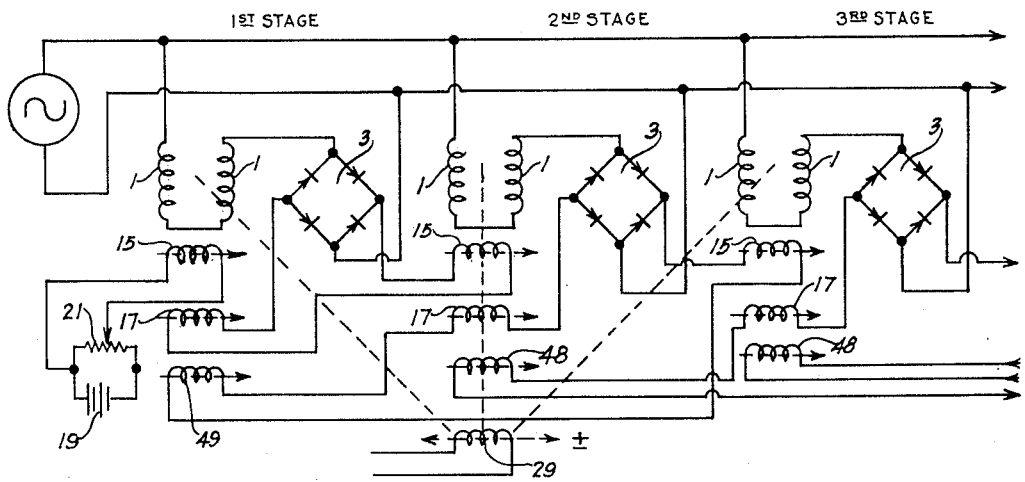
Fig. 9 is a diagram of the device so connected as to add pulses of one polarity and subtract pulses of opposite polarity.

The principle of combined feedback to a preceding stage and feed-forward to bias a succeeding one, as used in the device of Fig. 8, may also be used to give an entirely different but extremely valuable result, i. e., the ability of the counter to subtract as well as add. This is illustrated in Fig. 9, in which the basic circuit is the same as that shown in all of the preceding figures. Two modifications are illustrated, however, one of them unimportant and the other fundamental to the particular embodiment shown. The unimportant feature is that the feedback and biasing coils are connected in series instead of in parallel, this feature being incorporated in this figure merely to illustrate the possibility that has already been mentioned of so connecting the coils and not because it is specific to this embodiment. The important feature is the use of additional biasing coils 48 coupled back to the preceding stage and similar, generally, to the counter-flux coil 47 of Fig. 8 except that the connections are reversed so that the flux induced by them boosts that produced by the biasing and feedback coils on the same core. Therefore, instead of reverse-tripping the preceding stage it locks it more securely in the tripped state.

As a result of this connection the last stage to be tripped is much less stable than those preceding it. Accordingly, if a "negative" pulse—i. e., a pulse in the opposite sense to that used for additive counting—be imposed upon the pulse coil 29" it will carry the effective control current applied to this last-tripped stage back to the unstable point and this stage will reverse-trip. This effectively sets the preceding stage to receive a similar negative pulse, and the counter can therefore be made to add positive pulses and subtract negative ones without going through the expedient of adding complementary numbers.

The fact that the counter can be "reverse-tripped" also brings out the point that it is possible to make the state which has heretofore been referred to as the "tripped" state the normal state of a counter. Counting can be thus accomplished in reverse if this is, for any reason, desirable.

Figure 10:
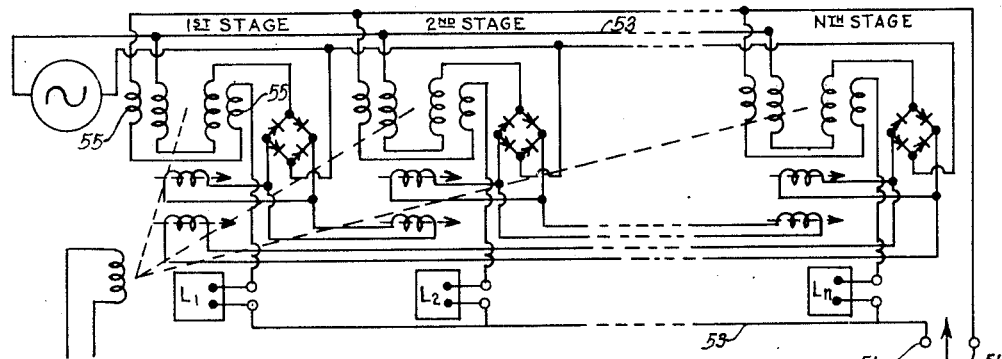
Fig. 10 is a schematic diagram indicating one method of employing the counter to operate gate circuits.

A valuable use for ring counters in general is for commutating or switching purposes and Fig. 10 shows one method of employing the counter of our invention for this purpose. The energy to be switched is fed into the terminals 51 to leads 53, across which are connected loads L₁, L₂, etc. in series with supplementary coils 55, which latter are wound in a manner substantially similar to the reactive coils 1. Such coils offer a high impedance either to short D. C. pulses or to alternating currents at frequencies of the order of the carrier frequency or even lower, as long as the corresponding coils are unsaturated. When saturation occurs the impedance of these coils drop in the same manner as does that of the reactive coils, thus effectively opening the gate for pulses or continuing alternating currents fed in from the terminals 51. Any of the resetting mechanisms which have been shown or described above may be used to reset the device and the loads to be gated can be coupled to any or all of the stages of the device. It is therefore possible to gate the stages successively by successive incoming pulses until all of the gates are open, using the resetting mechanism illustrated in Fig. 7, or the connection shown in Fig. 8 may be used to gate only one circuit at a time. Other arrangements will naturally suggest themselves to those skilled in the art.

It should be evident that numerous modifications and combinations of the embodiments of the inventions herein shown in detail are possible. The showings here made are therefore considered illustrative merely of the invention as defined by the following claims.

We claim:

1. A magnetic ring counter comprising a succession of reactive windings, rectifying means having an input circuit connected in series with each of said windings and circuit connections for supplying all of said windings and rectifying means from a source of alternating current; a saturable magnetic core within each of said windings, a pair of biasing windings magnetically coupled to each of said reactive windings by said core, an output circuit from said rectifying means connected to supply one of the biasing windings on the corresponding core and one on the core of a succeeding winding of the succession up to the last, and a triggering circuit including means for establishing flux pulses in all of said cores simultaneously.

2. A magnetic ring counter in accordance with claim 1 wherein said flux establishing means comprises a triggering winding and a core within said winding, and yokes connecting all of said cores magnetically in parallel as legs of a composite core.

3. A magnetic ring counter in accordance with claim 2 wherein the cores of said succession of windings are symmetrically arranged around the core of said triggering winding.

4. A counter in accordance with claim 1 including an additional winding on at least one of said cores, said additional winding being connected for excitation by the rectifying means associated with a succeeding core.

5. A counter in accordance with claim 4 wherein said additional winding is connected in such sense as to induce in its core a flux in opposition to that produced by the biasing windings on the same core.

6. A counter in accordance with claim 4 wherein said additional winding is connected in such sense as to induce an increased flux in said core.

7. A magnetic ring counter in accordance with claim 1 including means responsive to current from the rectifying means connected to the last winding of the succession for reducing the flux in the first core of said succession, thereby resetting said counter.

8. A magnetic counter in accordance with claim 7 wherein said current responsive means comprises an impedance in series with said supply circuit.

9. A magnetic counter in accordance with claim 7 wherein said current responsive means comprises an inductance having a ferromagnetic core and means for normally biasing said core to saturation, and a coil connected to the rectifying means associated with the last winding of said succession to oppose the flux of said biasing means.

10. A ring counter in accordance with claim 1 comprising an additional winding on each of said cores up to the last of the succession, each of said windings being connected for excitation from the rectifying means associated with a succeeding core in such sense as to increase the flux in the core within said additional winding.

11. A ring counter in accordance with claim 1 wherein one of the biasing coils on the first core of said succession is connected for excitation by the rectifying means associated with the last reactive coil of said succession.

12. A ring counter in accordance with claim 1 including an additional winding on each core of said succession connected for excitation through the rectifying means of the next succeeding core to produce a flux in opposite sense to the flux in the core within such additional winding, one of the biasing windings on the first core of said succession being connected for excitation through the rectifying means in series with the winding on the first core of said succession.

13. A counter in accordance with claim 1 including a supplementary winding on at least one of said cores adapted for connection to an external circuit to vary the effective impedance therein upon the registering by said counter of a predetermined count.

GEORGE J. GIEL, Jr.
MERYL C. BURNS.

No references cited.